Aug. 8, 1967 R. SCHNEIDER ETAL 3,334,624
INTRAMEDULLARY NAIL
Filed June 24, 1964

INVENTORS
ROBERT SCHNEIDER
PAUL GISIN
BY
McGlew & Toren
ATTORNEYS

United States Patent Office 3,334,624
Patented Aug. 8, 1967

3,334,624
INTRAMEDULLARY NAIL
Robert Schneider, Grosshochstetten, and Paul Gisin, Waldenburg, Switzerland, assignors to Synthes AG, Chur, Switzerland
Filed June 24, 1964, Ser. No. 377,727
Claims priority, application Switzerland, Sept. 26, 1963, 11,853/63
1 Claim. (Cl. 128—92)

The present invention relates to intramedullary nails for use in bone surgery, such as are employed for nailing thigh bones and leg bones, and to suitable instruments for use in fitting the intramedullary nails in position and extracting the same.

The former practice in the fitting of these intramedullary nails was to employ a punch tool insertable in the intramedullary nail and provided with a shoulder which fitted over the edge of the intramedullary nail. For the operation of extraction or knocking out the intramedullary nail, a hook was used which was inserted in a lateral aperture of the intramedullary nail. These instruments have various disadvantages. Thus, upon driving in the intramedullary nail the surrounding edge of the intramedullary nail was very often damaged, whilst when withdrawing the intramedullary nail, the extraction hook may not only very easily damage the wall of the intramedullary nail but can often tear out. When performing the operation of withdrawal or knocking out of the intramedullary nail, there is furthermore always the risk that the hook will spring out of the hole and will cause further damage to the wound.

Attempts have therefore been made to provide the surgical nails with a cylindrical internal thread and to employ a threaded bolt as the instrument for fitting and extracting the intramedullary nail. Experiments have, however, shown that for all the intramedullary nails which would come into consideration it is necessary to have a set of 12 to 15 different threaded bolts, which becomes especially impracticable if a intramedullary nail is required to be removed from a bone but the precise thread dimensions of the intramedullary nail are not known.

Furthermore experience with these experimental intramedullary nails has shown that the intramedullary nails are often deformed in the bone, whereby the thread does not retain its round shape and consequently the threaded bolt which is used for inserting the intramedullary nail can no longer be screwed into the intramedullary nail when the intramedullary nail is required to be extracted. If the next lower size of threaded bolt is used for screwing into the intramedullary nail, this will be in positive connection only at a very few points of the circumference of the intramedullary nail so that the bolt is torn out of the thread when an attempt is made to extract the intramedullary nail, whereby the thread can be so damaged as to render it unusable. A further disadvantage consists in the fact that it is very difficult to guide the threaded bolt in an exactly coaxial path into the intramedullary nail which is already embedded in the bone and so to screw the bolt into the intramedullary nail. This difficulty is particularly marked when using instruments which must be of angular shape for performing the insertion and extraction of the intramedullary nails. When an insertion or extraction instrument is connected to an intramedullary nail in an angular connection, or must be disposed in an angular relationship to the intramedullary nail in order to effect initial connection, there is danger that the outer threads will be immediately damaged.

The main purpose of the present invention is the avoidance of all these disadvantages by the provision of a novel form of surgical nail and a suitable instrument for the insertion and extraction thereof.

The invention consists in a intramedullary nail for use in bone surgery, wherein the intramedullary nail is provided at that end which is remote from the point thereof with a conically flared extension which is internally threaded for cooperation with a corresponding external thread of an instrument for insertion and extraction of the intramedullary nail. The apex angle of the conically flared extension may have a value between 6° and 20°. Preferably, the apex angle has a value of 10°. The invention also consists in a surgical instrument for use in inserting and extracting a intramedullary nail as hereinbefore defined, wherein the instrument is provided with a conical portion which is externally threaded for cooperation with the conically flared internally threaded extension of said intramedullary nail. The apex angle of the conical portion may have a value between 6° and 20°. Preferably, the apex angle has a value of 10°.

An object of this invention is to provide a surgical nail having a tapered thread at one end to permit easy withdrawal and removal of the intramedullary nail in the bone.

A further object of the invention is to provide a surgical nail and insertion instrument combination including conically threaded interengageable parts facilitating removal and insertion of the intramedullary nail in the bone.

A further object of the invention is to provide a surgical nail and insertion instrument which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
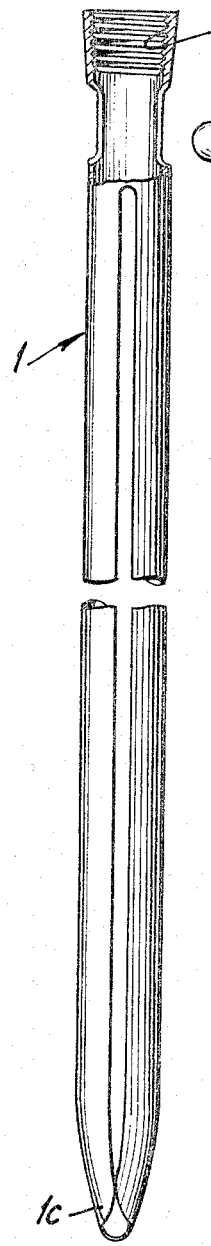
FIG. 1 is a side elevational view, partly broken away, of a surgical nail constructed in accordance with the invention for use in a bone, such as a thigh bone.

The surgical nail, which is indicated in FIG. 1 by the general reference 1 and which is adapted for the nailing of a thigh bone, differs from the surgical nails previously used essentially by the fact that, at the end which is remote from the point 1c, the intramedullary nail has a conically flared extension and this extension is provided with an internal thread 1b.

Figure 2:
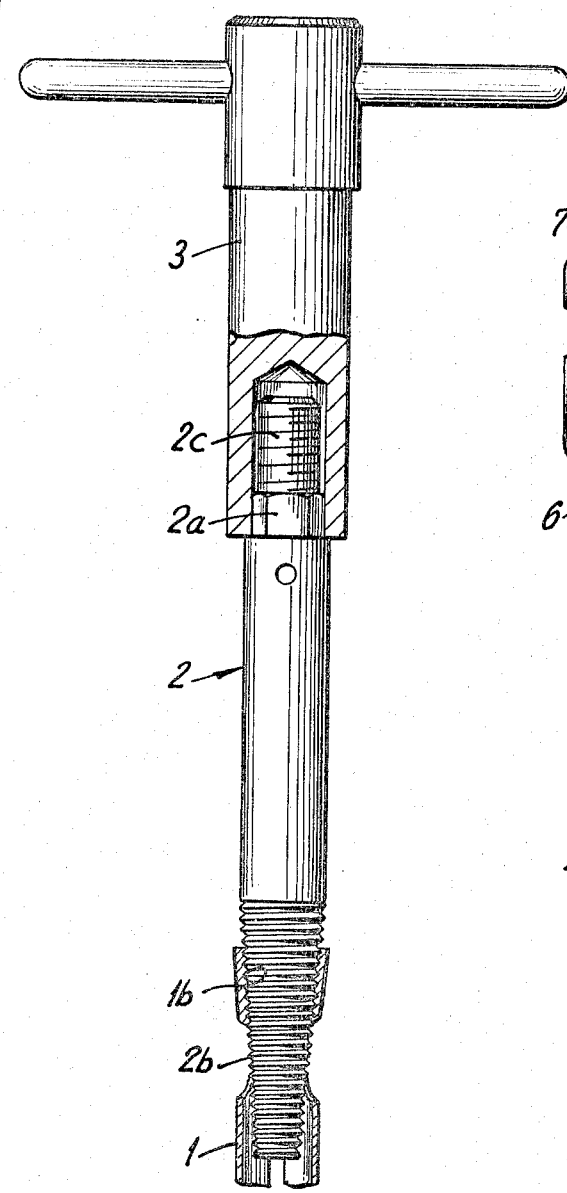
FIG. 2 is a partial side elevational view, partly in section, of an upper portion of the surgical nail with the withdrawn instrument secured thereto.
Figure 3:
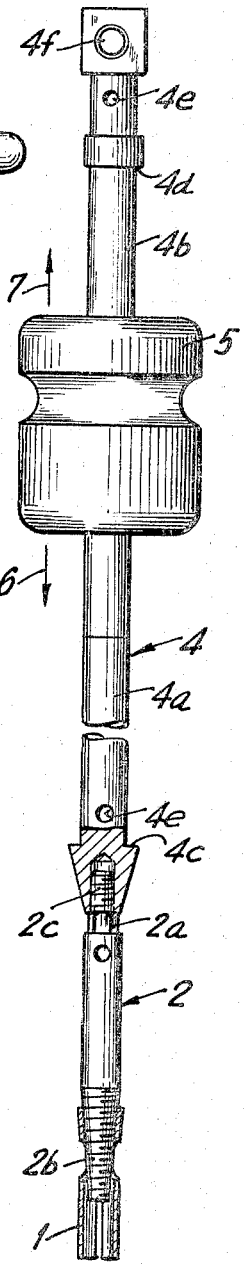
FIG. 3 is a view similar to FIG. 2 with the extension provided for inserting the intramedullary nail.

The cooperating instrument for insertion and extraction of the intramedullary nail is represented in FIGS. 2 and 3 and bears the general reference 2. This instrument is in the form of a plug which at one end is provided with a conical outer thread 2b, which fits into the thread 1b of the intramedullary nail. In this construction the angle of the cone may amount to about 10°, although obviously this angle could be more or less than this figure and advantageously could lie between 6° and 20°.

At the other end of the instrument 2 has a hexagonal collar 2a and a conventional thread 2c. As shown in FIG. 2, a suitable hexagonal key 3 may be fitted to the hexagonal collar 2a.

The thread 2c serves for screwing together the extension rod 4 consisting of the two components 4a and 4b, upon which rod the weight 5 can be displaced in the direction of the arrows 6 and 7. The section 4a of the guide rod is provided with a shoulder 4c and the section 4b is provided with a shoulder 4d. In addition, both of the sections of the extension rod have a transverse bore 4e allowing the insertion of a tommy bar so that the two sections can be easily screwed together or disassembled. A tapped bore 4f provided in the section 4b of the extension rod serves for the fitting of a resilient handle whereby the extension rod may be gripped without fatigue when inserting and removing the intramedullary nail.

If necessary, the instrument component 2 as well as the extension rod 4 may be made of hollow form to accommodate a thin guide rod. Between the instrument componest 2 and 4 there may, however, be inserted a slightly inclined hollow intermediary member which is provided with a lateral aperture for bringing out the guide rod.

For inserting an intramedlulary nail in a bone, the medullary tissues of the bone is first of all bored out in the usual way so as to allow the insertion of a guide rod. The plug 2 is then screwed into the intramedullary nail which is to be used, for which purpose the hexagonal key 3 may be used, if necessary. After this, the extension rod 4 carrying the striking weight 5 is screwed into the component 2, whilst possibly interposing the above-mentioned offset intermediary member. The intramedullary nail is inserted in the bore which has been prepared for it and the intramedullary nail is driven in into position by allowing the weight 5 to fall in the direction of the arrow 6 upon the shoulder 4c. When the intramedullary nail has reached its final position, the component 2 is again screwed out of the intramedullary nail. As soon as the bone has knit together, the connecting intramedullary nail must again be removed. For this purpose, the surgeon first of all frees the near conically flared end of the intramedullary nail, cleans the internal thread of the intramedullary nail and again screws in the component 2, which may be securely fitted in place by means of the hexagonal key. After this there is then screwed into the said component the extension rod 4 provided with the weight 5, and by striking the weight 5 in the direction of the arrow 7 upon the shoulder 4d the intramedullary nail is knocked out.

By employing the instrument according to the present invention, not only are all the above-mentioned disadvantages avoided, but in addition certain advantages are also achieved. There are required for all sizes of intramedullary nails only three different instruments, one for intramedullary nails having an outer diameter less than 10 mm., one for intramedullary nails having an outer diameter of 10 to 13 mm., and one for intramedullary nails having a larger external diameter. Consequently, it is of no consequence if the thread of an intramedullary nail becomes somewhat expanded, for example, as a consequence of being struck, because in that case the conical threaded plug can be screwed in deeper. Moreover, when using intramedullary nails which become slightly deformed to elliptical shape for any reason, for example by the knitting together of the bones, such intramedullary nails can be very satisfactorily gripped by the instrument because the walls of the intramedullary nail tend to assume the round shape when screwing in the threaded plug and then make positive connection with the entire circumference of the plug.

Furthermore, there is no risk when using conical threads that the plug will be screwed in at the wrong angle, because, as is well known, such threads automatically set themselves to the correct axial position when being screwed in, which fact is of particular importance if the instrument is to be screwed in for withdrawing an intramedullary nail already in the bone, the direction of whose axis cannot be accurately determined. All of these advantages accrue in addition to those advantages which may be expected from the use of a cylindrical thread, that is to say, the invention provides a completely positive connection between the striking implement consisting of the extension rod and the weight and the intramedullary nail which is to be driven in, so that, at each blow, an effect is obtained which is six to eight times as great as in the case where a fixed screw connection is omitted. When extracting the intramedullary nail, that is to say knocking out the intramedullary nail, there is the additional advantage that the extraction forces act over the entire circumference of the intramedullary nail so that no off center stresses are caused.

While specific embodiments of the invention have been shown and described in detail to illustrate the application of the inventive principles, it will be understood that the invention may be embodied otherwise without departing from such principles.

What is claimed is:

An intramedullary nail for use in bone surgery comprising an elongated hollow intramedullary nail member having an end which is pointed, an intermediary portion with at least one opening and an end which is remote from the pointed end having a closed conically flared extension, said conically flared extension being internally threaded with a conical tapered thread for cooperation with the corresponding external thread of an instrument for insertion and extraction of the intramedullary nail.

References Cited

UNITED STATES PATENTS

| 2,187,852 | 1/1940 | Friddle | 128—92 |
| 2,264,561 | 12/1941 | Bergmann et al. | 151—19 |
| 2,508,409 | 5/1950 | Lord | 151—19 |

OTHER REFERENCES

"Ezy-Out" screw extractor shown and described on pages 400 and 401, Journal of Bone and Joint Surgery, April 1954, vol. 36–A, No. 2.

Jewett Extractor-Impactor, No. 208J, Wright Advertisement, Jorunal of Bone and Joint Surgery, July 1954, vol. 36–A, No. 5, page 27.

McReynolds Driver Extractor, No. 460, Zimmer Advertisement, The Journal of Bone and Joint Surgery, July 1953, vol. 35–A, No. 3, page 17.

Zimmer Manufacturing Co. catalog for 1950, cloverleaf pins shown on top of page 110.

Stryker Broacle, No. 1402, for use with cloverleaf pins shown on the bottom of page 115A.

RICHARD A. GAUDET, *Primary Examiner.*

J. W. HINEY, *Assistant Examiner.*